United States Patent [19]

Leppich

[11] 4,034,860
[45] July 12, 1977

[54] TELESCOPING SHOCK ABSORBER WITH PLURAL VALVES

[75] Inventor: Erhard Leppich, Wolfsburg, Germany

[73] Assignee: Volkswagenwerk Aktiengesellschaft, Wolfsburg, Germany

[21] Appl. No.: 560,081

[22] Filed: Mar. 19, 1975

[30] Foreign Application Priority Data

Mar. 22, 1974 Germany .......................... 2413833
Jan. 10, 1975 Germany .......................... 2500826

[51] Int. Cl.² ........................................ F16F 9/34
[52] U.S. Cl. .............................. 188/282; 137/512; 137/854; 188/322
[58] Field of Search ................. 188/282, 317, 322; 137/512, 512.3, 516.15, 843, 854, 859

[56] References Cited

U.S. PATENT DOCUMENTS

| 2,717,058 | 9/1955 | Brundrett | 188/322 X |
| 3,194,262 | 7/1965 | Hamilton et al. | 137/525 X |
| 3,200,843 | 8/1965 | Jackson | 137/525 X |
| 3,312,312 | 4/1967 | De Carbon | 188/317 |
| 3,380,560 | 4/1968 | Katz | 188/317 X |

FOREIGN PATENT DOCUMENTS

| 1,337,519 | 8/1963 | France | 188/317 |
| 1,287,455 | 3/1959 | Germany | 188/317 |
| 1,678,593 | 6/1954 | Germany | 188/317 |
| 833,574 | 3/1952 | Germany | 188/317 |
| 1,235,536 | 6/1971 | United Kingdom | 188/317 |

*Primary Examiner*—George E. A. Halvosa
*Attorney, Agent, or Firm*—Spencer & Kaye

[57] ABSTRACT

In a telescoping shock absorber which has a cylinder containing a damping medium and a piston slidably disposed in the cylinder, within the confines of the cylinder there are provided separate first and second channels provided with valves. The valves are so oriented that — in response to the motion of the piston — in the one channel there will be a medium flow only in the one direction and in the other channel there will be a medium flow only in the other, opposite direction. At least one of the channels has a first valve designed as a function of the desired damping characteristics of the shock absorber and a second valve disposed downstream of the first valve with respect to the flow direction of the damping medium in that channel. The second valve is structured merely as a check valve to open at least approximately simultaneously with the opening of the first valve and to close prior to the closing of the first valve.

10 Claims, 6 Drawing Figures

TELESCOPING SHOCK ABSORBER WITH PLURAL VALVES

BACKGROUND OF THE INVENTION

This invention relates to a telescoping shock absorber which finds particular use in motor vehicles and which is of the type that has a cylinder and a reciprocating piston accommodated in the cylinder. The piston is provided with separate flow channels for the two possible flow directions of a damping medium and valves in the channels for ensuring a unidirectional flow in each channel.

There are also known telescoping shock absorbers in which a sole channel in the piston is utilized for accommodating the damping medium which alternatingly flows therein in both directions. The telescoping shock absorber having two separate channels for the two flow directions has the advantage, however, that for each displacement of the piston, the damping medium situated in the zone of the channel valves is driven out, together with any gas bubbles that may have been formed. Such gas bubbles, as it is known, may, particularly if they are located in the valve zone, alter the damping characteristics of the shock absorber in an undesirable manner. On the other hand, however, in telescoping shock absorbers having separate channels for the two flow directions, difficulties may be encountered if the channels are designed for achieving predetermined shock absorbing characteristics. As a function of the mass of the movable valve member and the design of the associated valve springs, upon reversal of the piston motion a hysteresis is introduced so that irregularities are superimposed on the desired course of the damping curve which expediently should depend solely from speed.

SUMMARY OF THE INVENTION

Accordingly, it is an object of the invention to provide an improved telescoping shock absorber which, on the one hand, ensures a good circulation of the hydraulic damping medium even in case of small piston strokes and which, on the other hand, permits a valve design for the purpose of achieving predetermined shock absorbing characteristics in such a manner that during operation of the shock absorber no irregularities caused by hysterses will occur in the course of the damping force.

For accomplishing the above-outlined object of the invention, the starting point is a telescoping shock absorber of the above-outlined type in which one of the flow channels contains a first valve designed to establish the desired characteristic of the shock absorber and a second valve which is in series with the first valve and which is arranged downstream thereof with respect to the flow direction associated with that channel. A shock absorber of a structure having two serially arranged valves in one channel is disclosed, for example, in German Pat. No. 1,287,455. The first, or upstream, valve (as viewed in the flow direction) has a relatively weak valve spring, whereas the second, or downstream valve is provided with a relatively strong valve spring. Further, there is provided a throttled bypass short-circuiting the second valve. The purpose of the serial connection of the two valves is to accomplish a predetermined characteristic in that first the first valve opens under the effect of a relatively low pressure and there is established, by virtue of the above-mentioned throttled bypass, a communication with the cylinder chamber disposed downstream of the second valve. The second valve opens only in response to a relatively high pressure, so that the curve representing the damping force as a function of the piston speed has a "jump" in its course. This "jump" has a slope that depends upon the dimensioning of the throttled bypass. It is thus essential for this known structure that both valves be designed to contribute to the shock absorbing characteristics and that the second valve be bridged by a throttled bypass.

Contrarily, according to the invention, the bypass bridging the second valve is omitted and the second valve is designed as a simple check valve which opens at least approximately simultaneously with the opening of the first valve and closes prior to the closing of the first valve. Thus, the second valve according to the invention does not contribute to the predetermined characteristic curve of the telescoping shock absorber but, upon reversal of the piston motion, ensures that the 2-valve channel in which the second valve is situated will be closed independently from the moving mass and the force of the spring of the first valve. The latter thus can be designed solely for the purpose of achieving the desired shock absorbing characteristics. Conversely, the check valve which has only a very small moving mass, opens simultaneously with the first valve upon reversal of the piston motion so that the mode of operation of the first valve and thus the damping characteristics of the shock absorber determined by the first valve are in no way influenced by the second valve. It is further seen that in the arrangement according to the invention, by virtue of the absence of the above-discussed throttled bypass characterizing the structure disclosed in German Pat. No. 1,287,455, there will be no medium flow in any part of the channel if either one of the two valves is in its closed state.

A preferred embodiment — which finds application particularly in single-tube shock absorbers — provides that the other flow channel too, in addition to a first valve designed in accordance with the desired characteristics, has a second, serially arranged valve which — in the absence of a bypass bridging the second valve — is designed only as a simple check valve to open at least approximately simultaneously with the opening of the first valve and to close prior to the closing of the first valve.

By virtue of the rapid closing of the flow channels in the piston, achieved by the second valve provided and designed according to the invention, upon reversal of the piston, the otherwise present hysteresis is at least significantly reduced, without abandoning the advantage of a thorough circulation of the damping medium. This hysteresis, as it was noted before, can be traced to the design of the valve determining the shock absorbing characteristics.

For accomplishing the same advantages discussed above, according to the invention — alone, or in combination with the above-outlined, piston-carried valve arrangement — there is provided a valve assembly which is stationarily supported on the bottom of the shock absorber cylinder. Such a valve assembly, as known, serves for providing a flow path between the work chamber proper in the cylinder and a storage or equalization chamber for the damping medium. The communication between the two chambers is established by this valve assembly only as the piston approaches the same. In order to ensure, in this embodiment too, the freedom with regard to the design of the valve assembly for obtaining a predetermined valve characteristic, without the danger of a reverse flow upon sudden reversal of the direction of motion of the piston, the telescoping shock absorber according to the invention is characterized in that there is provided, downstream of a first outlet valve (as viewed in the direction of flow) a second outlet valve which is designed merely as a simple check valve which opens at least approximately simultaneously with the first outlet valve and closes prior to the closing of the first outlet valve.

It is apparent that an optimum behavior will characterize that shock absorber which has both in the zone of the channels in the piston and in the zone of the stationary valve assembly in the cylinder bottom, check valves according to the invention, which, on the one hand, operate very rapidly and, on the other hand, do nevertheless not affect the damping characteristics of the shock absorber.

In order to achieve the desired rapid operation of the check valve, the latter expediently has a movable valve member constituted by a spring disc so that there will be no separation between a large-mass valve member and a valve spring supplying the operational force.

Thus, according to the invention, by means of the rapid closing of the flow channels effected by the second valve, the hysteresis, caused mostly by the design of the characteristic-determining first valve, is at least significantly reduced upon reversal of motion of the piston without, at the same time, abandoning the advantage of a good circulation of the damping medium.

As it was found as a result of extensive tests with telescoping shock absorbers designed according to the invention, by means of definite designs of the first and second valves additional significant advantages can be achieved. It is noted already at this point that the corresponding design of telescoping shock absorber according to the invention can be regarded as a specific embodiment of this telescoping shock absorber and also as a successive arrangement of valve parts, that is, spring discs, designed in a particular manner, rather than as a succession of two valves designed in a particular manner.

The problem whose solution is sought by this embodiment of the invention is the elimination of the so-called "hammering" effect. As it was found during the tests and considerations coupled with the invention, it is the behavior of the telescoping shock absorber under relatively high-frequency actuations with short strokes which is determinative regarding the generation of hammering noises.

Based on this recognition, the solution of the problem of eliminating hammering noises which may be effected both in the piston of the shock absorber and in the stationary valve assembly in the cylinder bottom, is characterized in that both valves are designed without pre-openings (bypasses) and are provided with spring discs as movable valve members. The spring disc of the first valve is supported along its other marginal zone and is, in the closed state, practically in a relaxed condition. The spring disc of the second valve, on the other hand, is supported along an inner zone and is, in the closed state, in a slightly biased condition.

For an explanation of the above-outlined embodiment of the invention, the following relationship should be considered:

The simplest form of a damping valve is a hole which throttles the fluid flow. In telescoping shock absorbers such a pure hole throttle is not used because of its strongly progressive characteristics. Thus, an esential element of all known valves in shock absorbers are ports with pressure-dependent flow passages. All these valves fall in either one or the other of the following two structural categories:

1. The channel is closed by a rigid disc which is pressed against a valve seat by a coil spring;

2. The channel is closed by a spring disc which thus combines the force-exerting resilient elements and the movable valve member.

In both structural modes, before the valve opens, there must be generated a pressure difference which depends from the spring bias in the position of rest (closed position of the valve). Thus, damping characteristics are obtained which, independently from the piston speed, deliver, immediately upon the beginning of the motion, a well-determined minimum force whch depends from the spring bias. Such a behavior, however, is, as a rule, undesirable in hydraulic oscillation dampers. For this reason, the known valves are designed in such a manner that they have pre-openings, that is, additional flow passages of constant cross section. These pre-openings serve, at low piston speeds, for supplying the desired small forces which, as the speed approaches zero, also decrease towards a zero value and gradually loose significance because of the progressive characteristic of the hole-damping effect at higher speeds.

As the tests and considerations connected with the invention have shown, a shock absorber designed to optimize the elimination of hammering noises should have valves which operate with the minimum delay and which, even at the beginning of the piston motion, deliver a certain force without exceeding a limit value required to ensure riding comfort. According to the invention, this is effected in the telescoping shock absorber by the following characteristics:

1. A first and second valve are connected one behind the other; the first valve is designed solely to supply the desired characteristics, whereas the second valve is designed solely as a check valve.

2. Both valves are of such a structure that
   a. they have no pre-openings;
   b. the spring disc or discs of the first valve are supported along their other marginal zone and are practically in a relaxed condition in the state of rest; and
   c. the spring disc or discs of the second valve are supported along an inner zone thereof and are slightly biased in the state of rest.

The design of the two valves without pre-openings — for the purpose of achieving an immediate response of the valve assembly even in case of small, high-frequency actuations which give rise to hammering problems — generates problems in the setting of the shock absorber characteristics which are, however, resolved or avoided by the features discussed under b and c, above. The opening characteristics of the spring discs supported at the outside and at the inside differ from one another. Considering identical valve dimensions and the same given spring displacement for both types of valves, there is obtained the same force, but in case of a spring disc supported at the inside which thus lifts off at its outer edge, there is obtained a significantly greater flow passage opening than in the case of an externally supported spring disc. Conversely, externally supported spring discs, which thus lift off in the inner zone, supply, even subsequent to the lifting, damping forces which are useful and can be controlled for the purposes of the telescoping shock absorber. The combination of features b and c results in a desired damping force even as early as the beginning of the piston motion and as the piston speed increases there is maintained, for the damping force, the prescribed course predetermined to ensure satisfactory riding conditions. Due to the serial connection of the valves, it is possible to design the dimensions of the components of the two valves independently from one another and thus to construct them solely with the desired performance in view.

DESCRIPTION OF THE PREFERED EMBODIMENTS

The embodiments which will now be described in detail, are of a construction which finds advantageous application in the suspension system of automotive vehicles.

Figures 1, 1A, 3:
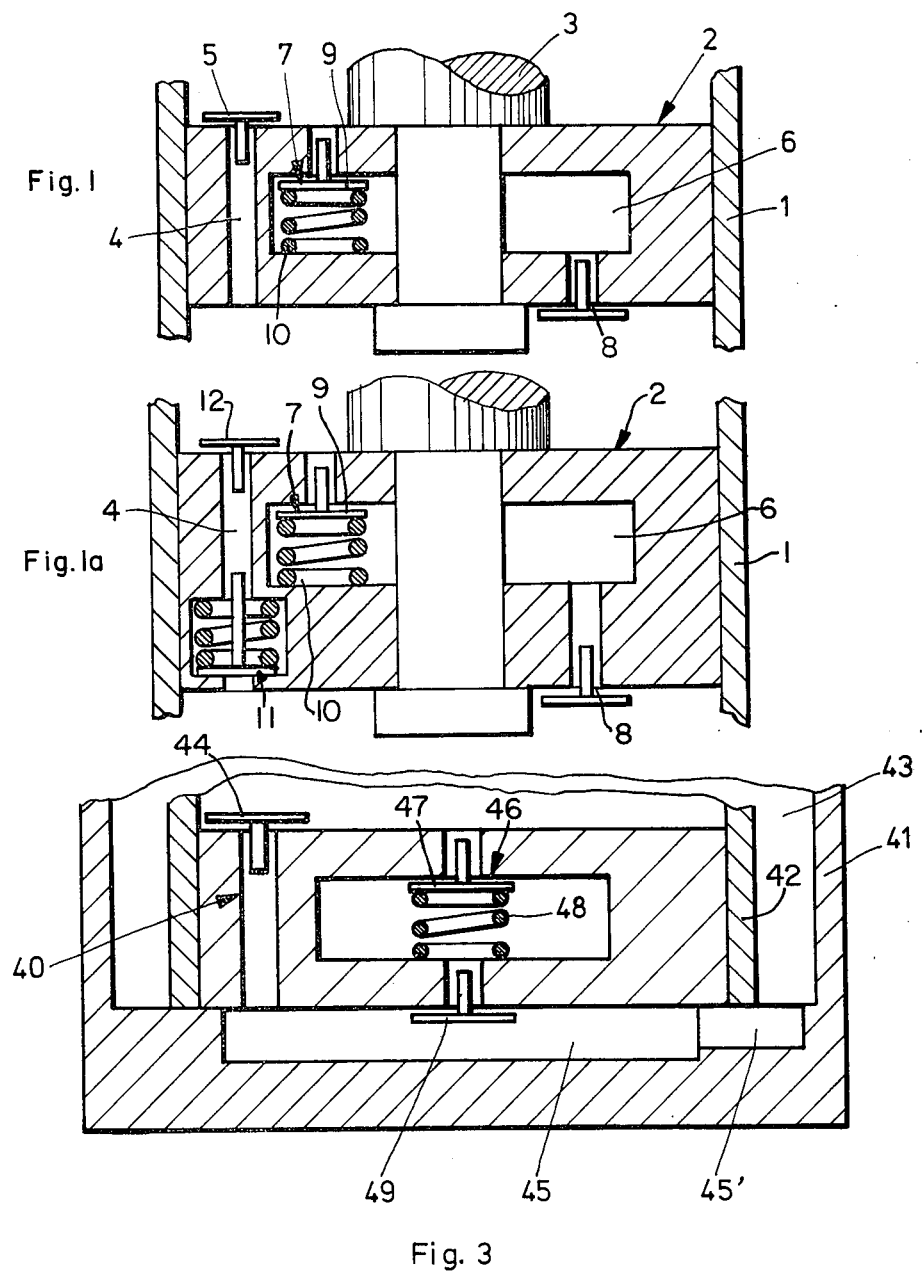
FIG. 1 is a longitudinal view of a preferred embodiment of the invention arranged in the shock absorber piston.
FIG. 1a is a longitudinal sectional view of another preferred embodiment of the invention arranged in the shock absorber piston.
FIG. 3 is a longitudinal sectional view of a further preferred embodiment of the invention arranged in the bottom of the shock absorber cylinder.

Turning now to FIG. 1, there is illustrated an axial length portion of a cylinder 1 of a telescoping shock absorber as well as a piston 2 accommodated in the cylinder 1. The piston 2 may be displaced against the damping medium pressure (prevailing in the cylinder 1) by a force exerted on the piston rod 3 which projects from the cylinder 1 in a conventional manner.

In the piston 2 there are provided channels 4 and 6 for the medium flows generated during the displacement of the piston 2 in the two possible directions. In channel 4, by virtue of the particular orientation of a valve 5, there can be a medium flow present only if the piston 2 moves downwardly as viewed in FIG. 1, whereas in the channel 6 there can be a medium flow only during an upward motion of the piston 2 by virtue of the orientation of valves 7 and 8 disposed in the channel 6.

As it may be observed in FIG. 1, as viewed in the direction of medium flow, the valve 7 is the first or upstream valve, whereas the valve 8 is the second or downstream valve which, contrary to the valve 7, is designed as a simple check valve. Contrarily, the valve 7 is dimensioned as a function of the desired damping characteristics of the shock absorber. It can thus be seen that the valve 7, in addition to a movable valve member 9, has a valve spring 10 which is designed solely as a function of the desired shock absorbing characteristics. Such a design of the valve 7 is possible by virtue of the use, in series with the valve 7, of a simple check valve 8 according to the invention. Assuming first that the second valve 8 is absent, then the delay of the closure of the first valve 7 after the reversal of the piston 2 from an upward motion to a downward motion depends on the design of the first valve 7. A hysteresis which this phenomenon would introduce into the characteristics of the shock absorber is excluded by the use of the second valve 8 according to the invention, which valve is designed only as a check valve, so that it will not contribute to the damping characteristic of the shock absorber. Independently from the closing speed of the first valve 7, the second valve 8 closes very rapidly, so that any flow in the opposite direction subsequent to a reversal of the direction of motion of the piston 2 from a downward motion to an upward motion, the second valve 8, by virtue of its rapid operation due to its design as a low-mass member, in no way hinders the mode of operation of the first valve 7.

Since, as before, there are provided separate channels for the two flow directions of the damping medium in the shock absorber, there will be experienced no difficulties due to a bubble formation in the zone of the valves, since during each piston motion there is effected a thorough rinsing of the channels. This characteristic distinguishes the inventive structure in an advantageous manner over the arrangement disclosed in German Pat. No. 1,210,339, according to which there is provided within a hollow piston rod, a chamber which accommodates a medium flow in both directions. Particularly in case of relatively small pistons strokes, the pressure medium is merely displaced back and forth in this chamber without effecting a rinsing and thus an elimination of any gas bubble that may have been formed.

Referring to FIG. 1a, the embodiment shown therein differs from that of FIG. 1 in that not only the channel 6 (operational during upward motions of the piston 2), but also the channel 4 (operational during downward motions of the piston 2) is provided with a two-valve assembly according to the invention. Thus, in channel 4, the valve 11 is, as viewed in the direction of the flow of the medium, the first or upstream valve (structurally corresponding to the valve 7 in channel 6) and the valve 12 is the second or downstream valve (structurally corresponding to the valve 8 in channel 6).

Figure 2:
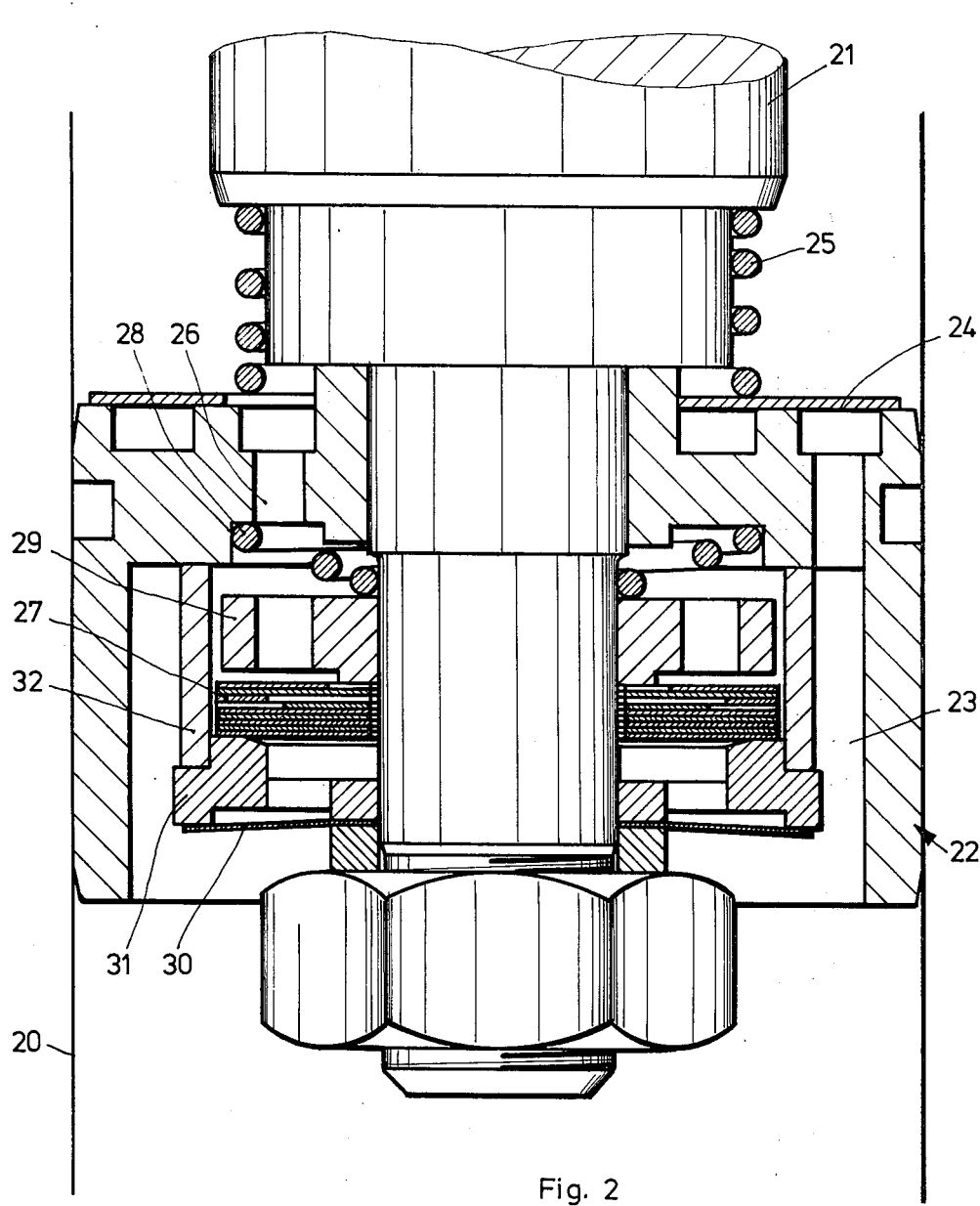
FIG. 2 is a longitudnal sectional view of another preferred embodiment of the invention arranged in the shock absorber piston.

Turning now to the embodiment illustrated in FIG. 2, there is shown an inner wall portion of a shock absorber cylinder 20 in which there is disposed a piston 22 displaceable by means of a piston rod 21. Here again, thereare provided separate channels 23 and 26 with individual valves for the two flow directions of the damping medium. During the movement of the piston 22 in the downward direction as viewed in FIG. 2, the channel 23 is effective, since during such a motion, an associated valve plate 24 is lifted by the liquid pressure against the force of a valve-closing spring 25. During the movement of the piston 22 in the upward direction, on the other hand, there will be medium flow in the channel 26, since the valve plate 24 is provided, at the upper radial face of the piston 22, with an opening aligned with the channel 26 and since further, a spring disc stack 27, under the effect of the pressure of the damping medium and a guiding spring 28, is now deflected to such an extent that between a pressure plate 29, the spring stack 27 and the piston rod 21, there are formed flow passages which constitute part of the channel 26. The arrangement formed of components 21, 27, 28 and 29 is conventional in itself.

According to the invention there is provided a second valve which is designed as a simple check valve and which is disposed, when viewed in the direction of medium flow through the channel 26, downstream of the valve described in the preceding paragraph. The second valve has, as its movable member, merely a spring disc 30 which, in the closed position, is in engagement with a lower radial edge face of an annular component 31. Together with a cylindrical sleeve 32, the annular component 31 forms a chamber accommodating the first valve 27, 28, 29. By virtue of the check valve 30 — even if a strong guide spring 28 is provied which may be a requirement for further decreasing the hysteresis — it is ensured that as the piston 22 reverse its direction of motion from upward to downward, the channel 26 is very rapidly closed, so that a medium flow against the desired flow direction in this channel is effectively prevented.

Turning now to FIG. 3, there is shown the bottom portion of a shock absorber cylinder 41, to which there is fixedly secured a valve assembly generally indicated at 40. Within the cylinder 41 there is positioned a tube 42 spaced from the inner wall of the cylinder 41, so that an annular chamber 43 is defined which is filled with a damping medium and which serves as a storage or equaization chamber therefor.

As soon as the piston which is not illustrated in FIG. 3 and which may be of the design as shown in FIGS. 1 or 2, moves upwardly in the tube 42 as viewed in FIG. 3, a check valve 44 opens, so that there will be obtained a flow path to the equalization chamber 43 through the ports 45 and 45' in the bottom zone of the cylinder 41. As soon as the piston moves downwardly, the check valve 44 closes and a first outlet valve 46 opens. The latter comprises a movable valve member 47 which is pressed by the fluid medium downwardly against the force of a spring 48. The masses of the valve member 47 and the spring 48 are so dimensioned that they contribute to the desired damping characteristics of the shock absorber.

If the simple check valve 49 (second outlet valve) provided according to the invention in series with the first outlet valve 46 were omitted, upon reversal of motion of the piston from a downward movement to an upward movement, the first outlet valve 46 would likely to remain open for a short period of time, that is, for a period which is determined by the dimensions of the first outlet valve 46, and ultimately, by the desired characteristics of the shock absorber. Such an occurrence is prevented by the provision of the check valve 49 which is so dimensioned that it not only opens approximately simultaneously with the first outlet valve 46, but also closes more rapidly, so that immediately upon termination of the downward motion of the piston, the channel controlled by the valves 46 and 49 will be closed.

Although it is advantageous to provide a simple check valve designed according to the invention both on the piston and in the bottom zone of the cylinder, there may be instances where the use of this measure only in the piston or only in the cylinder would lead to the desired result.

Figure 4A:
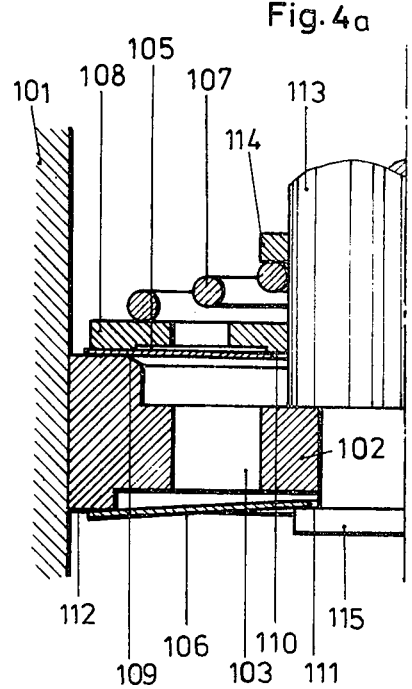
FIGS. 4a and 4b are longitudinal views showing two different operational positions of one symmetrical half of still another preferred embodiment of the invention arranged in the shock absorber piston.
Figure 4B:
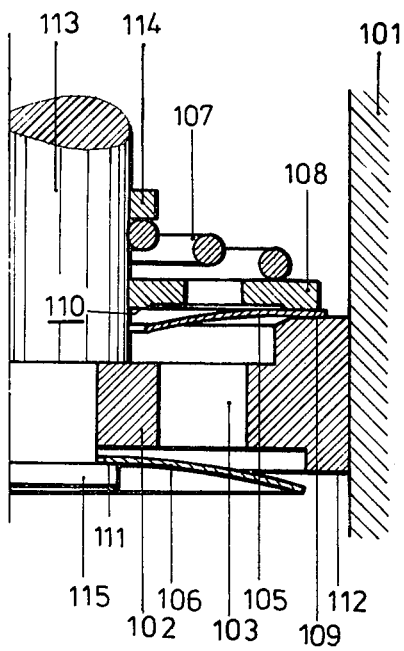

A further embodiment is illustrated in FIGS. 4a and 4b which show the valves in their closed and open state, respectively.

In FIGS. 4a and 4b there is shown a portion of a cylinder 101 of the shock absorber. As before, it is adapted to slidably receive a piston which is provided with separate channels for the two flow directions of the damping medium. In this embodiment the piston has a transverse wall 102 which, for forming the flow channels, is provided with openings 103. For purposes of better visibility, in FIGS. 4a and 4b there are shown the channels and valves associated with only one flow direction.

Similarly to the previously described embodiments shown in FIGS. 1–3, in this embodiment too, there are provided in the flow direction two serially arranged valves which, according to the invention, are both designed as spring discs; each valve has only a sole spring disc, although it is conceivable to provide a spring disc stack. The spring disc associated with the first valve is designated at 105, whereas that associated with the second valve has the reference numeral 106. The two spring discs 105 and 106 differ from one another according to the invention as follows.

The spring disc 105 of the first valve which is designed as a function of the desired shock absorbing characteristics, is supported under the effect of a guide spring 107 and a clamping disc 108 externally (that is, along the outer marginal zone of the spring disc 105) on a support face 109 on the wall 102. Thus, the valve 105 is lifted in the zone of its inner edge — in response to the corresponding pressure conditions — from the seating surface 110 provided on the clamping disc 108. By virtue of an at least approximately copolanar relationship between the support (clamping) face 109 and the valve seating face 110, it is ensured that in the closed state the valve 105 is practically in a fully relaxed condition.

The valve support face 109 continues in a chamfered portion oriented in the direction of the medium flow, that is, in the opening direction of the spring disc 105. In this manner, the spring characteristics of the spring disc 105 are favorably affected.

The spring disc 106 of the second valve, which is designed as a check valve, is supported on a radial face 111 with its inner edge. Thus, under corresponding flow conditions, the valve 106 lifts off its seating surface 112 along its outer edge zone.

Since the spring disc 106 which is lifted off its seat along its outer zone, opens, for the same extent of displacement, a substantially wider flow passage than the spring disc 105 which is supported (clamped) along its outer zone, the course of the force associated with the spring disc 106 of the second valve is very flat with respect to that associated with the spring disc 105 of the first valve. This applies also when the spring disc 106 is slightly biased closed in its position of rest, as it may be observed in FIG. 4a.

The entire valve assembly it held together by means of a central, rivet-like carrier 113 which, at ths same time, constitutes part of the piston rod and which is provided with axially spaced, flange-like end portions 114 and 115 between which the piston and the valve assembly are supported. It is thus seen that the spring 107, the claping disc 108, the spring disc 105 and the spring disc 106 are held against opposite faces of the transverse wall 102 by the flanges 114 and 115 in sequence as viewed in the flow direction associated with these valves.

Figure 5:
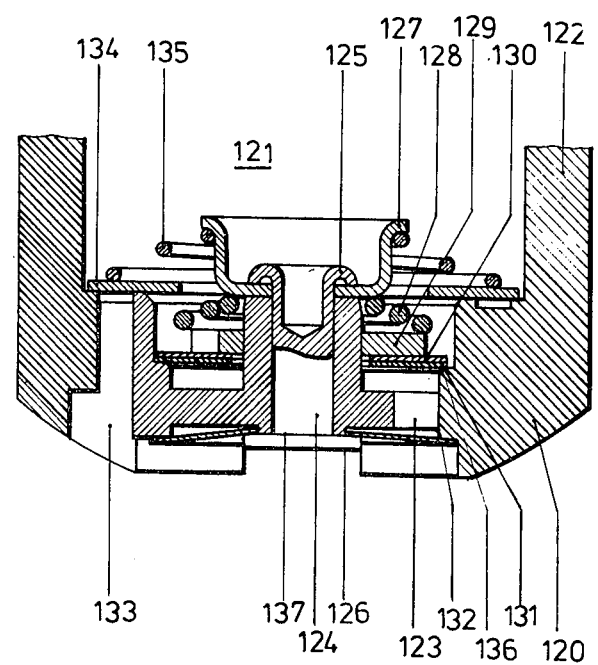
FIG. 5 is a longitudinal sectional view of a further preferred embodiment of the invention arranged in the bottom of the shock absorber cylinder.

The above-described structural principle illustrated in FIGS. 4a and 4b is also found in the embodiment according to FIG. 5. Here, a transverse wall 120 constitutes a component of a cylinder 122 which surrounds a work chamber 121. Again, the transverse wall 120 is provided with flow passages 123 which form channels and which extend to an equalization chamber situated immediately below the wall 120. A rivet-like carrier component 124 holds together, with its flange-like, axially spaced end portions 125 and 126, the outlet valve assembly by means of a bowl-shaped pressure component 127. The outlet valve assembly is formed of a first outlet valve constituted by a guide spring 128, a star-shaped clamping disc 129 and a spring disc 130. The outlet valve assembly is further formed by a second outlet valve which is constituted by the spring disc 132. There is further provided an additional flow channel 133 for the medium flow in the opposite direction which occurs when the piston (not shown in FIG. 5) moves upwardly. With the channel 133 there is associated an individual suction valve which includes a spring disc 134 and a guide spring 135. The valve 133, 134 too, is supported on the transverse wall 120 by means of the rivet-like carrier component 124.

In the embodiment according to FIG. 5, again, the spring discs 130 and 131 of the first valve which is designed as a function of the desired shock absorbing characteristics, are supported along their outer edge by the chamfered support face 136. On the other hand, the spring disc 132 of the second valve, which is designed as a check valve, is supported in the zone of its inner edge at the inner radial face 137 of the flange 126. In this manner the same relationships are achieved as in the piston valve assembly described in connection with FIGS. 4a and 4b.

It is apparent that it may be expedient to so design the telescoping shock absorber that it includes a valve assembly designed according to the invention, both in the cylinder bottom and in one or both flow channels of the piston. In this case care has to be taken that the spring discs of the first valves are not at least substantially relaxes in their position of rest, that is, in their closed state, while the spring discs of the second valves are slightly biased closed in their closed state. By "slight bias" there should be understood a pretensioned state which is obtained when the spring disc is bent between its supported inner and outer zones to an extent which corresponds to about the thickness of the spring disc. Contrarily, as it was discussed earlier, the spring discs of the first valves are maintained in a bias-free manner in the closed state.

It will be understood that the above description of the present invention is susceptible to various modifications, changes and adaptations, and the same are intended to be comprehended within the meaning and range of equivalents of the appended claims.

What is claimed is:

1. In a telescoping shock absorber having a cylinder containing a damping medium; a piston slidably disposed in the cylinder; means provided within the confines of the cylinder for defining separate first and second channels; valve means disposed in the first and second channels with opposite orientation to provide for a flow of the damping medium solely in a first direction in the first channel upon movement of the piston in a first direction of motion and to provide for a flow of the damping medium solely in a second direction in the second channel upon movement of the piston in a second direction of motion; the improvement wherein the valve means in at least one of said channels comprises a. a bypassless first valve having open and closed positions and arranged for opening in response to the pressure of the damping medium solely in the direction corresponding to the flow direction associated with said at least one channel; said first valve, when in its closed position, fully blocking a flow of the damping medium in any part of said at least one channel; said first valve being designed as a function of the desired damping characteristics of the telescoping shock absorber; and b. a bypassless second valve disposed downstream of said first valve with respect to the flow direction associated with said at least one channel; said second valve having open and closed positions and arranged for opening in response to the pressure of the damping medium solely in the direction corresponding to the flow direction associated with said at least one channel; said second valve, when in its closed position, fully blocking a flow of the damping medium in any part of said at least one channel; said second valve being a check valve arranged for opening at least approximately simultaneously with said first valve and for closing prior to the closing of said first valve.

2. A telescoping shock absorber as defined in claim 1, wherein said channels are provided in said piston.

3. A telescoping shock absorber as defined in claim 2, wherein said cylinder includes means defining a work chamber in which said piston operates and means defining an equalization chamber; there are provided separate said first and second channels forming part of the cylinder structure and connecting said work chamber with said equalization chamber; the first and second valves in one of the last-named channels constituting first and second outlet valves, respectively; said first and second outlet valves being arranged for opening in response to the pressure of the damaging medium solely during movement of said piston towards said outlet valves.

4. A telescoping shock absorber as defined in claim 2, wherein said valve means comprising said first and second valves are separately provided in both said first and second channels.

5. A telescoping shock absorber as defined in claim 1, wherein said cylinder includes means defining a work chamber in which said piston operates and means defining an equalization chamber; said first and second channels forming part of the cylinder structure and connecting said work chamber with said equalization chamber; said first and second valves constituting first and second outlet valves, respectively, being secured in one of said channels and being arranged for opening in response to the pressure of the damping medium solely during movement of said piston towards said oulet valves.

6. A telescoping shock absorber as defined in claim 1, wherein sid second valve has a movable valve member constituted by a spring disc.

7. A telescoping shock absorber as defined in claim 1, said first valve having a movable valve member constituted by a first spring disc; means for supporting said first spring disc along an outer marginal zone thereof; means for seating said first spring disc along an inner zone thereof, said inner zone being spaced radially inwardly of said outer marginal zone; said first spring disc being in a substantially relaxed condition when seated; said second valve having a movable valve member constituted by a second spring disc; means for seating said second spring disc along an outer marginal zone thereof; means for supporting said second spring disc along an inner zone thereof; said inner zone of said second spring disc being spaced radially inwardly of said outer marginal zone of said second spring disc; said second spring disc being slightly biased closed when seated.

8. A telescoping shock absorber as defined in claim 7, further comprising a transverse wall member having opposite first and second faces; means defining throughgoing openings in said transverse wall member, said throughgoing openings constituting said channels; said first and said second spring discs being disposed, respectively, at said first and second faces of the wall member; said second face of the wall member having a portion constituting said means for seating said second spring disc; said first valve further including a clamping disc having a first portion in engagement with said outer marginal zone of said first spring disc and a second portion constituting said means for seating said first spring disc; said first valve further including a spring urging said clamping disc against said outer marginal zone of said first spring disc; said spring, said first portion of said clamping disc and a part of said first face of said wall member constituting said means for supporting said first spring disc.

9. A telescoping shock absorber as defined in claim 8, further comprising a carrier member having spaced flanges affixed thereto; said spring, said clamping disc, said first spring disc and said second spring disc being held by and between said flanges against said faces of said wall member in sequence with respect to the direction of flow of the damping medium in the channel controlled by said first and second spring discs.

10. A telescoping shock absorber as defined in claim 7, wherein said means for supporting said first spring disc continues in a portion chamfered in the opening direction of said first and second spring discs.

* * * * *